(12) United States Patent
Aoki

(10) Patent No.: US 6,600,922 B1
(45) Date of Patent: Jul. 29, 2003

(54) MOBILE STATION WITH INTELLIGENT CONTROL OF SCAN TIME BETWEEN HOME BAND SCANS WHEN ROAMING

(75) Inventor: Shigehide Aoki, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/449,233

(22) Filed: Nov. 24, 1999

(30) Foreign Application Priority Data

Nov. 25, 1998 (JP) .......................................... 10-334555

(51) Int. Cl.⁷ ................................................ H04Q 7/20
(52) U.S. Cl. ...................... 455/432; 455/67.1; 455/434; 455/455
(58) Field of Search ................................ 455/422, 423, 455/432, 434, 455, 67.1, 226.1, 226.2, 166.2

(56) References Cited

U.S. PATENT DOCUMENTS

| | | | | |
|---|---|---|---|---|
| 4,101,836 A | * | 7/1978 | Craig et al. .............. | 455/227.1 |
| 4,903,320 A | * | 2/1990 | Hanawa ...................... | 455/432 |
| 4,905,301 A | * | 2/1990 | Krolopp et al. ............. | 455/434 |
| 4,916,728 A | * | 4/1990 | Blair ......................... | 455/434 |
| 5,276,905 A | | 1/1994 | Hurst et al. ................ | 455/432 |
| 5,950,130 A | | 9/1999 | Coursey ..................... | 455/432 |

FOREIGN PATENT DOCUMENTS

| | | |
|---|---|---|
| GB | 2 328 582 A | 2/1999 |
| JP | 5-328429 | 12/1993 |
| JP | 6-311101 | 11/1994 |
| JP | 7-231470 | 8/1995 |
| JP | 8-33019 | 2/1996 |
| JP | 8-98252 | 4/1996 |
| JP | 8-205230 | 8/1996 |
| JP | 9-215039 | 8/1997 |
| JP | 9-266594 | 10/1997 |
| JP | 10-65769 | 3/1998 |
| JP | 10-224285 | 8/1998 |

* cited by examiner

Primary Examiner—Quochien Vuong
(74) Attorney, Agent, or Firm—Scully, Scott, Murphy & Presser

(57) ABSTRACT

A mobile station is capable of quickly returning to its home system when roaming. A detecting system detects, when the home system is not available, signal-level of the present control channel. A control system determines a change in the signal-level and controls scan time between scans of band of the home system in response to the change in signal-level.

18 Claims, 7 Drawing Sheets

MOBILE STATION WITH INTELLIGENT CONTROL OF SCAN TIME BETWEEN HOME BAND SCANS WHEN ROAMING

BACKGROUND OF THE INVENTION

1. Field of the Invention

The present invention relates to mobile stations capable of roaming. More particularly, the present invention relates to mobile stations with intelligent control of scan time between home band scans when roaming.

2. Acronyms

The written description provided herein contains acronyms that refer to, for example, various telecommunication services, components and techniques. For purposes of the written description, acronyms will be defined as follows:

Personal Communications Services (PCS)
Personal Communications Network (PCN)
Mobile Telephone Switching Office (MTSO)
Public Switched Telephone Network (PSTN)
System Access List (SIL)
Control Channel (CCh)
System Identification Code (SID)

3. Background Information

The use of wireless or mobile communication devices has increased greatly in recent years. Mobile and cellular telephones have enabled mobile station users to roam over large geographic areas while maintaining immediate access to telephony services. Mobile stations include portable units, units installed in vehicles and fixed subscriber stations. Mobile stations comprising cellular telephones or wireless handsets are operable in cooperation with cellular or Personal Communications Services (PCS) communications systems. Cellular communication systems typically provide service to a geographic area by dividing the area into many smaller areas or cells. Each cell is serviced by a radio transceiver (i.e. a transmitter-receiver base station or cell site). The cell sites or base stations may be connected to Mobile Telephone Switching Offices (MTSOs) through landlines or other communication links, and the MTSOs may, in turn, be connected via landlines to the Public Switched Telephone Network (PSTN).

FIG. 1 illustrates the basic components of a conventional cellular network. As shown in FIG. 1, a mobile station 10 may place or receive calls by communicating with a cell site 12 or a cell site 14, depending upon the geographic location of the mobile station and the cell coverage area that is provided by each cell site. That is, cell coverage area 16 of cell site 12 or cell coverage area 18 of cell site 14. For purposes of illustration, mobile station 10 is depicted in FIG. 1 as being able to communicate with either cell site 12 or cell site 14, even though the mobile station is not illustrated as being located within cell coverage area 16 or cell coverage area 18. Under normal operating conditions, the extent to which mobile station 10 will be able to communicate with cell site 12 or cell site 14 will depend on the geographic location of the mobile station and the size of the cell coverage area of each cell site. Further, although only two cell sites are depicted in FIG. 1, the entire cellular network may include, for example, more than two cell sites. In addition, more than one cell site may be connected to each MTSO.

Mobile station 10 may include a conventional cellular telephone unit with a transceiver and antenna (not shown) to communicate by, for example, radio waves with cell sites 12 and 14. Various air-interface technologies may be implemented to facilitate communication between the mobile station and the cell sites. Cell sites 12 and 14 may both include a radio transceiver (not shown) and be connected by landlines 20 or other communication links to MTSOs 22 and 24. The PSTN 26 is also connected to each MTSO 22 and 24 by landline 20 or other communication links.

The MTSOs 22 and 24 may be conventional digital telephone exchanges that control the switching between the PSTN 26 and the cell sites 12 and 14 to provide wireline-to-mobile, mobile-to-wireline and mobile-to-mobile call connectivity. The MTSOs 22 and 24 may also (i) process mobile station status data received from the cell site controllers; (ii) handle and switch calls between cells; (iii) process diagnostic information; and (iv) compile billing information. The transceiver (not shown) of each cell site 12 and 14 provides communications, such as voice and data, with mobile station 10 while it is present in its geographic domain. The MTSOs 22 and 24 may track and switch mobile station 10 from cell site to cell site, as the mobile station passes through various coverage areas. When mobile station 10 passes from one cell to another cell, the MTSO of the corresponding cell may perform a "hand-off" that allows the mobile station to be continuously serviced.

In the current cellular system, any given area may be serviced by up to two competing service providers. The two competing service providers are assigned different groups of frequencies through which services are provided. A frequency set typically includes control channels and voice channels. The control channels are used for preliminary communications between a mobile station and a cell site for setting up a call after which a voice channel is assigned for the mobile station's use on that call. While each frequency set for a given cellular service area is assigned to only one service provider, in different service areas the same frequency set may be assigned to different service providers or companies.

Whenever it places a call, the mobile station will ordinarily attempt to use the home frequency set to establish the call. If a call is handled outside of the user's home network area, then the mobile station is said to be "roaming" and service will be attempted through a frequency set of a non-home service provider. Typically, the user's home service provider will have a roaming agreement or reciprocal billing arrangement with the non-home service provider to permit service to be extended to the user's mobile station when it is roaming in the non-home service provider's service area.

When it is roaming in the non-home service provider's service area during its operation in an automatic mode, the mobile station scans for its home band (i.e., the set of frequencies corresponding to its home network system) to locate a control channel at regular intervals.

SUMMARY OF THE INVENTION

According to one aspect of the present invention, there is provided a mobile station capable of quickly returning to a home system of the mobile station from operation to roam within a communication network, the communication network comprising a plurality of cell sites, the mobile station comprising:

a detecting system for detecting, when the home system is not available, signal-level of an available control channel: and a control system to determine a change in the signal-level, said control system being operative to control scans of band of the home system in response to said determined change in the signal-level.

According to another aspect of the present invention, there is provided a roaming process for enabling a mobile station to quickly return to a home system of the mobile station from operation to roam within a communication network, the communication network comprising a plurality of cell sites, the mobile station comprising:

detecting, when the home system is not available, signal-level of an available control channel;

determining a change in the signal-level; and controlling scans of band of the home system of the mobile station in response to said determined change in the signal-level.

DESCRIPTION OF THE PREFERRED EMBODIMENT

Referring to the accompanying drawings, a detailed description of the preferred embodiments and features of the present invention will be provided.

The present invention relates to a mobile station with intelligent control of scan time between home band scans when roaming. The present invention permits a mobile station to intelligently control scan time between periodic home band scans when the mobile station is roaming in order to quickly obtain service on its home system while conserving its battery life.

This and other features of the present invention and aspects of the present invention will now be described in greater detail with reference to the accompanying drawings.

Figure 1:
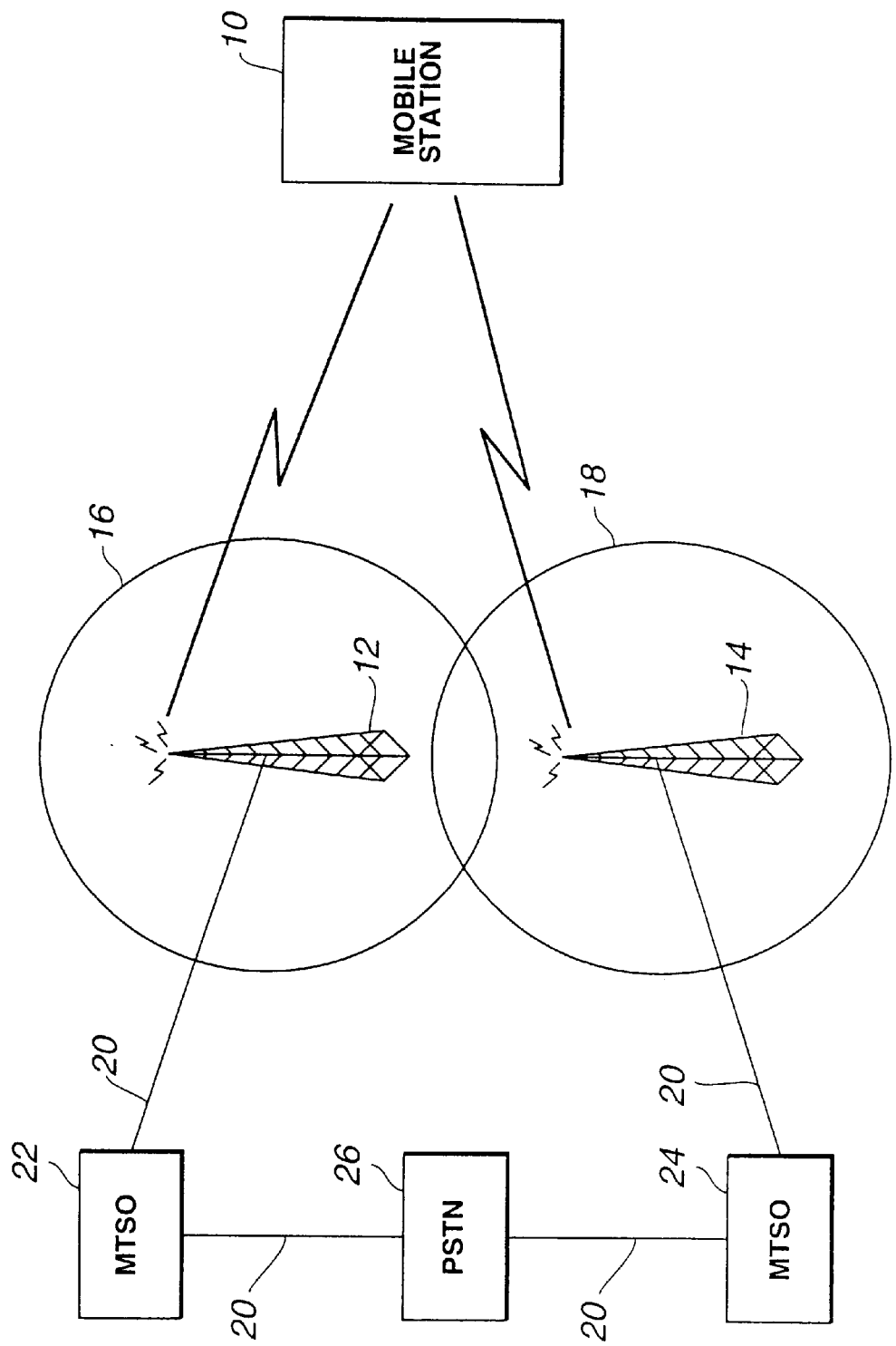
FIG. 1 illustrates the basic components of a conventional cellular network system.
Figure 2:
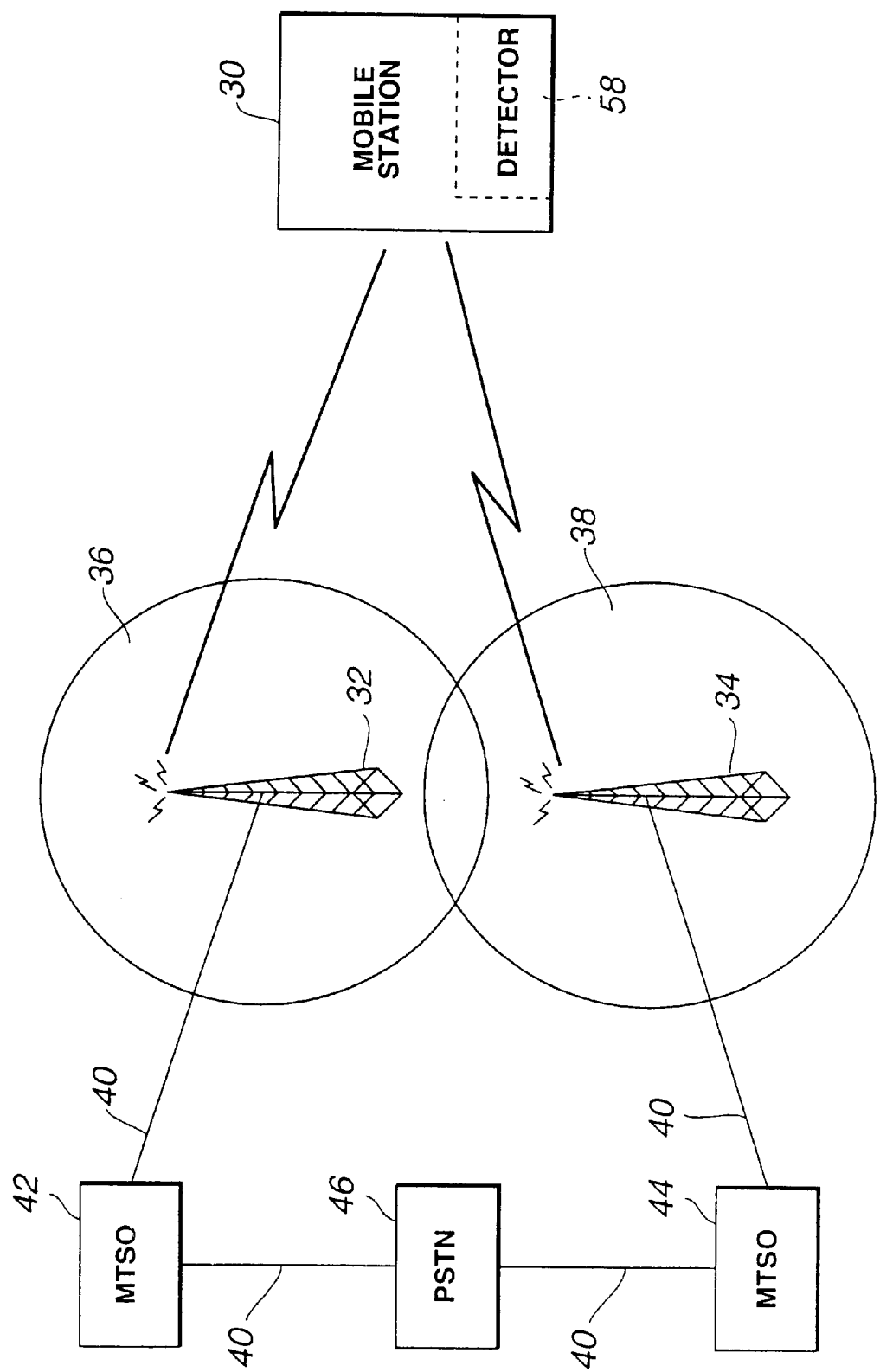
FIG. 2 illustrates exemplary components of a cellular or PCS network system.
Figure 3:
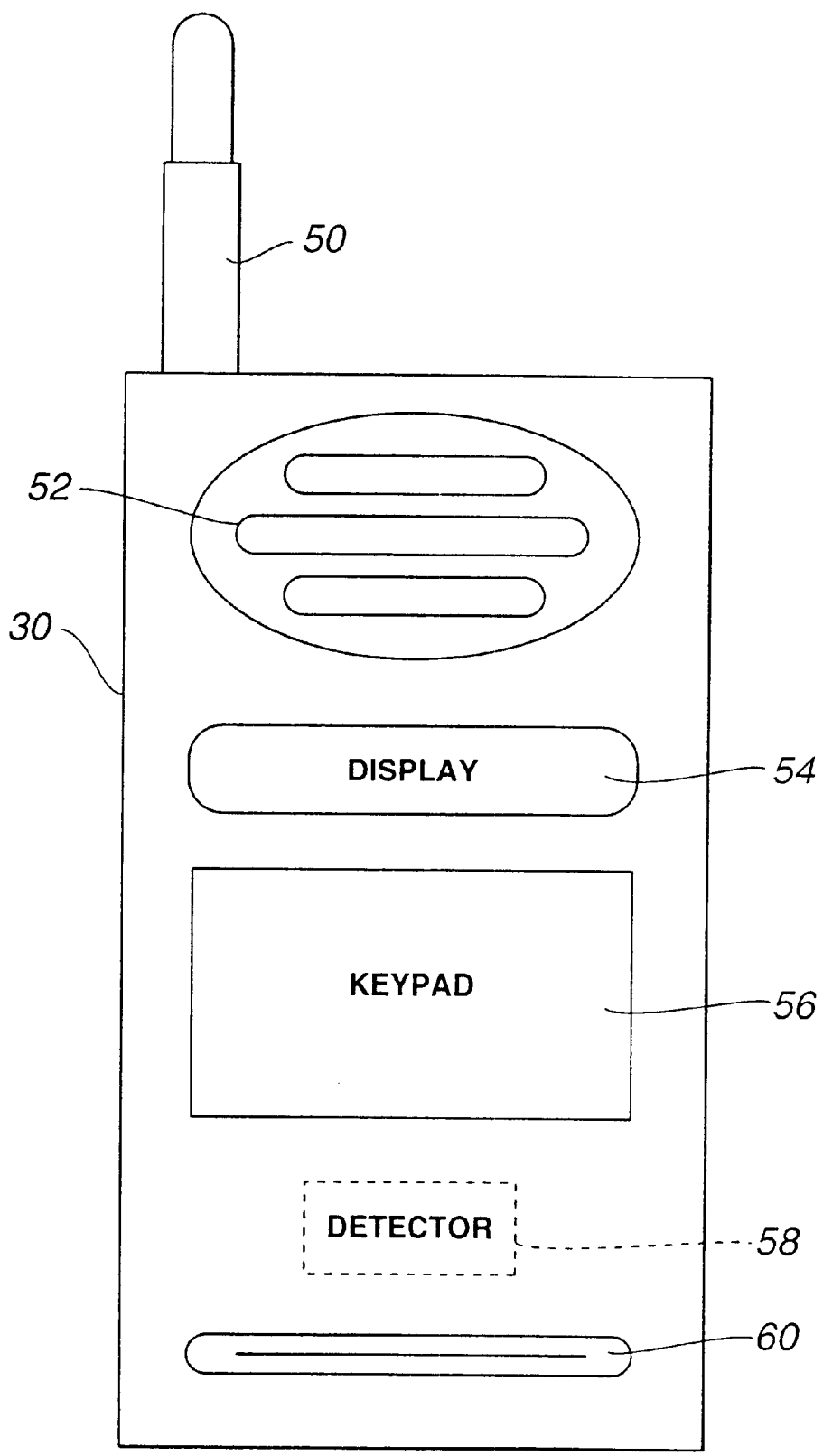
FIG. 3 illustrates an exemplary mobile station implemented as a cellular telephone unit.
Figure 4:
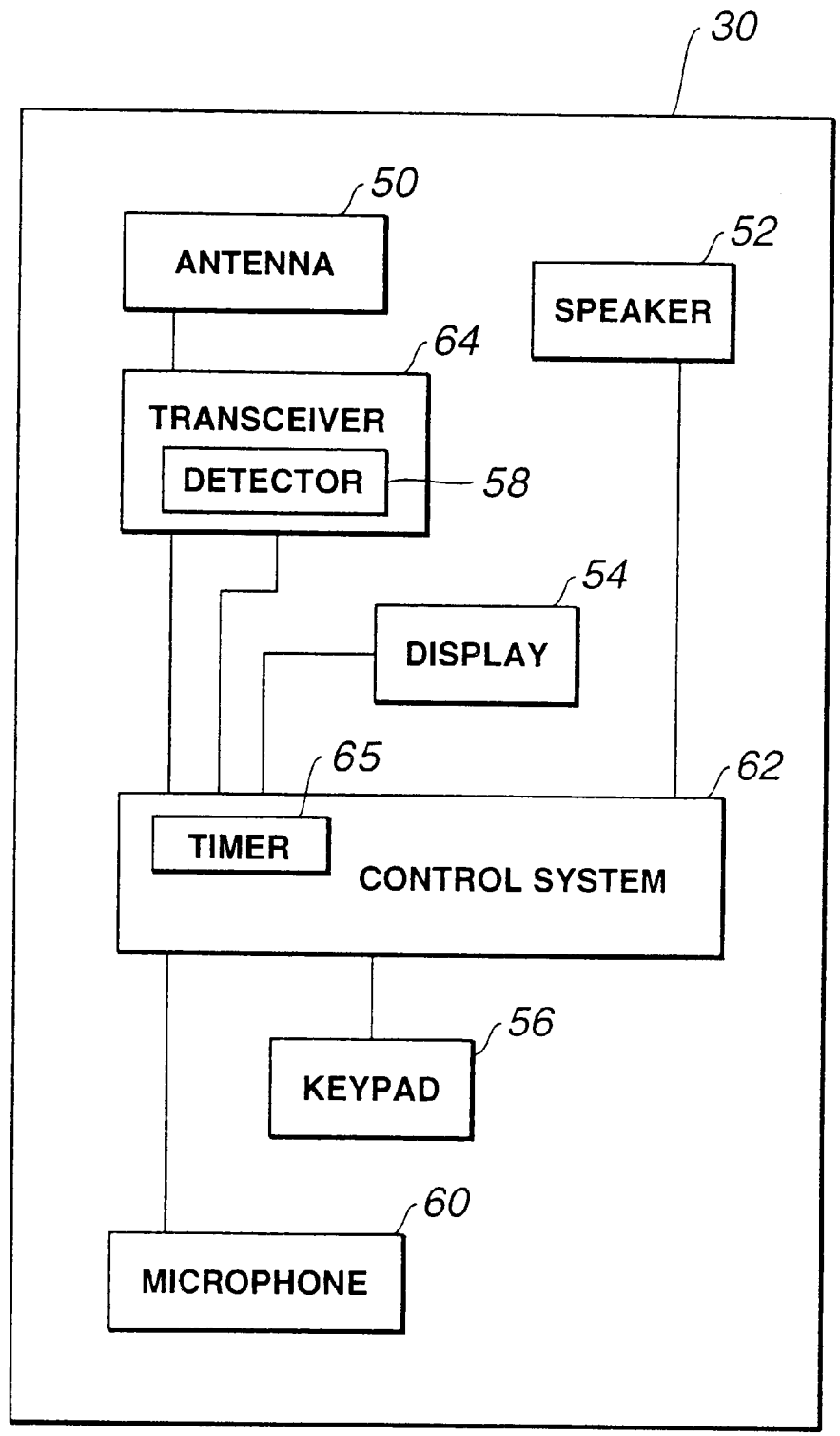
FIG. 4 is a general block diagram of the components of the mobile station of FIG. 3.

FIGS. 2 to 4 illustrate exemplary network architecture and exemplary system components for implementing the intelligent home band scan time control of the present invention. In FIGS. 2 to 4, a mobile station-based approach is provided for implementing the intelligent home scan time control of the present invention. As will be appreciated from the following description, the mobile station-based approach has an advantage in that it includes the ability to integrate into conventional cellular or PCS network environments without requiring modification to the main network components.

In FIG. 2, exemplary components of a cellular network are illustrated. Although the present invention is described with reference to a cellular network environment, the present invention may also be applied to a PCS or PCN network environment, in which lower powered cell sites and smaller cell areas are utilized. In FIG. 2, a mobile station 30 is provided with a received signal-level detector 58. The mobile station 30 has a detecting system including the detector 58 periodically detect a signal level of the present control channel (CCh) being used by the mobile station. The mobile station 30 processes data derived from the periodical detection of signal level of the present CCh. When roaming, the mobile station 30 relies on these processed data to control home band scan attempts in order to conserve battery life and to quickly obtain service from a home system of the mobile station 30. Instead of or in addition to the data of signal level of a CCh, data of error rate of the CCh may be used. According to one embodiment of the present invention, which will be described in connection with FIGS. 2 to 6, the mobile station 30 obtains the processed data after calculating a change in data of signal level at the last detection and at the one before last. According to another embodiment of the present invention, the mobile station 30 detects a signal level of each of a plurality of CChs from a plurality of cell sites including a selected cell site of a non-home system, which the mobile station obtains service from. The second embodiment will be described mainly in connection with FIG. 7. When roaming, the mobile station 30 process these data and relies on these processed data to control home band scan attempts in order to conserve battery life and to quickly obtain service from a home system of the mobile station 30.

The mobile station 30 may comprise portable phone units; units installed in vehicles and fixed subscriber units. By way of non-limiting example, the mobile station 30 may be implemented as a cellular telephone unit with a transceiver and antenna (see for example FIGS. 3 and 4) to communicate by, for example, radio waves with one or more cell sites. In FIG. 2, cell cites 32 and 34 are illustrated. The mobile station 30 may place or receive calls by communicating with cell cite 32 or cell cite 34, depending upon the location of the mobile station and the cell coverage area that is provide by each cell site. That is, when the mobile station 30 is located within cell coverage area 36 it may communicate with cell cite 32, and when it is located within cell coverage area 38 it may communicate with cell site 34. As will be appreciated by those skilled in the art, the actual cell coverage area for a cell site will depend upon various factors, including the power of the transceiver of the cell site, the placement and location of the cell site, and the topography of the locality of and surrounding areas where the cell site is located. Further, although only two cell sites are depicted in FIG. 2, the cellular network may of course include more than two cell sites. Moreover, it should be noted that the various components of the cellular network depicted in FIG. 2 are provided for the purpose of illustration only, and that other types of network arrangements may of course be provided to implement the feature of the invention. In addition, more that one site may of course be served by each MTSO.

Each of the cell sites 32 and 34 may include, for example, a radio transceiver (not shown) and be connected by land lines 40 or other communication links to Mobile Telephone Switching Offices (MTSOs) 42 and 44. The land lines 40 may also be utilized to connect the MTSOs 42 and 44 to Public Switch Telephone Network (PSTN) 46.

The MTSOs 42 and 44 may be conventional digital telephone exchanges that control the switching between PSTN 46 and the cell sites 32 and 34 to provide wireline-to-mobile, mobile-to-wireline and mobile-to-mobile call connectivity. The MTSOs 42 and 44 may provide various functions, including (i) processing mobile station status data received from the cell site controllers, (ii) handling and switching calls, (iii) processing diagnostic information, and (iv) compiling billing information. The transceiver (not shown) of each cell site 32 and 34 may provide communication services, such as voice and data communication, with mobile station 30 while it is present in its cell coverage area. Tracking and switching of the mobile station from the cell site to cell site may be handled by the MTSOs, as the mobile station passes through various cell coverage areas. When for example, mobile station 30 passes from one cell to another cell, the MTSO of the corresponding cell may perform a "hand-off" that allows the mobile station to be continuously serviced.

As shown in FIG. 3, the mobile station 30 may be implemented as a cellular telephone unit that comprises an antenna 50, a speaker 52, a microphone 60, a display 54, and a keypad 56 for alphanumeric information. The cellular telephone unit of the mobile station 30 may be constructed in a similar fashion to that of a conventional cellular telephone, with the exception of unique programming and contents for implementing the intelligent home can scan time control aspects of the present invention. Further, the detector 58 of the mobile station 30 detects signal level of the present CCh, which the mobile station 30 is receiving.

The speaker 52 comprises a conventional speaker for converting electrical audio signals received by the antenna 50 into acoustic audio signals. The microphone 60 comprises a conventional microphone for converting voice utterances of a user from acoustic audio signals into electrical audio signals for transmission by antenna 50. In addition, display 54 and keypad 56 may be implemented by conventional display and keypad devices for displaying and permitting entry of alphanumeric and other information.

An exemplary block diagram representation of the components of the mobile station 30 depicted in FIG. 3 is provided in FIG. 4. As discussed above, the cellular telephone unit of the mobile station 30 may comprises an antenna 50, a speaker 52, a display 54, a keypad 56, and a microphone 60. The antenna 50 may be connected to a transceiver 64, which in turn is connected to a control system 62. Control system 62 may be implemented as a microprocessor-based control system and may be programmed to carry out the intelligent home band scan time control features and logic of the present invention. A received signal-level detector 58 included in a receiver portion of the transceiver 64 is also connected to the control system 62. A timer 65 is included in the control system 62. The timer 65 may be a timer routine where decrement of a set value is made at clock intervals. Control system 62 may control the various components of the mobile station 30 to permit a user to send and receive calls and program the mobile station. In addition, control system 62 may rely on processed data of signal level of a CCh received by antenna 50 to control scan time between home band scans when the mobile station is roaming. A more detailed description of the various processes and functions of the home band scan time control feature of the present invention, as well as the logic steps associated with the home band scan time control method, is provided below with reference to the accompanying drawings.

Figure 5:
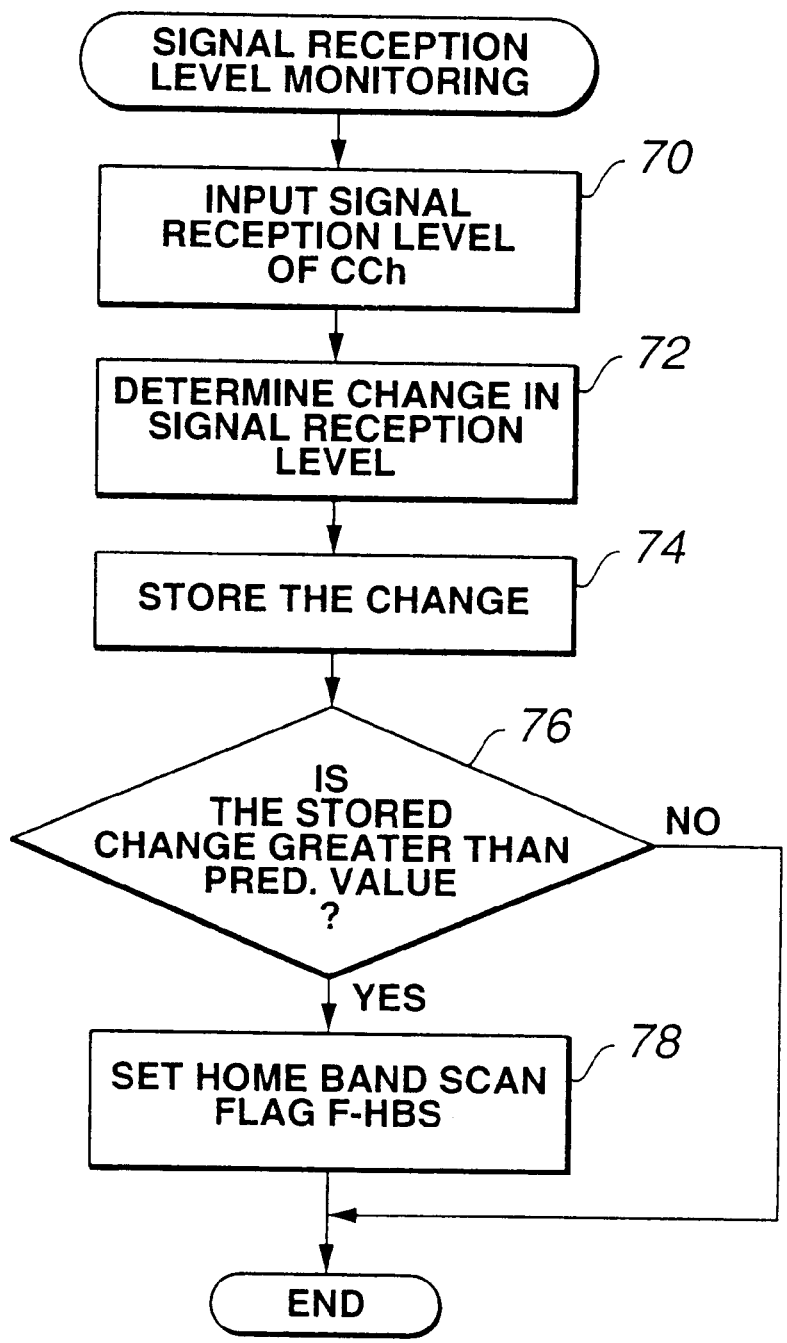
FIG. 5 is a flow diagram of a signal reception level monitoring routine of the process and operations of a roaming process.
Figure 6:
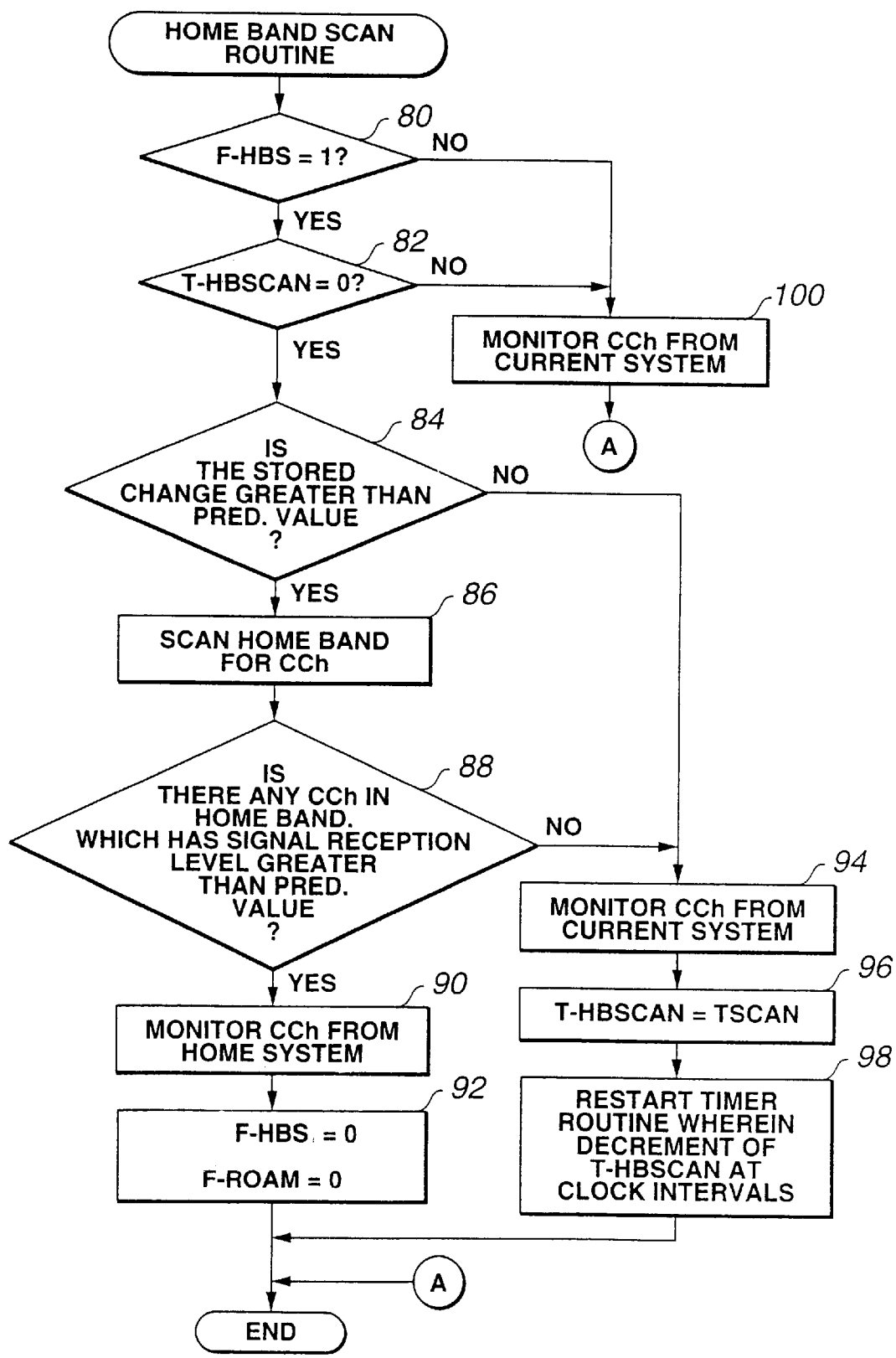
FIG. 6 is a flow diagram of a home band scan routine of the process and operations of the roaming process.

Referring now to FIGS. 5 and 6, an exemplary logic flow diagram of the intelligent home band scan control process or method of the present invention will be discussed, in accordance with an embodiment of the present invention. The various processes and operations illustrated in FIGS. 5 and 6 may be carried out by the control system 62 of the mobile station 30 through the use of programmed logic. The intelligent home band scan time control method of the present invention is carried out when the mobile station 30 is roaming. Although the description below is made with reference to a cellular network environment, the various processes and operation may also be applied to PCS or PCN network systems.

Whenever a mobile station 30 is not engaged in a call, it will periodically, at regular intervals, check a CCh from a cell site which it obtains service from. The mobile station 30 determines whether it is in its home system. Whether or not the mobile station is located in its home system may be determined by analyzing the SID or equivalent system identification number of the cellular service provider for the area in which the mobile station 30 is located. By comparing the SID received on the CCh with the home SID of the home service provider, the mobile station may determine whether it is located in its home system. The home SID may be stored in an appropriate memory or storage device of the mobile station.

Whenever a roaming mobile station checks periodically the present CCh to wait for a call, it executes a routine of FIG. 5.

At step 70 in FIG. 5, the control system 62 of the mobile station 30 inputs a received signal-level, as detected at the detector 58, of the present CCh received by the transceiver 64 via the antenna 50. At step 72, the control system 62 determines a change or difference between the present signal-level and the last signal-level. At step 74, the control system 62 stores the determined change at a signal-level recording table within an appropriate memory or storage device. At interrogation step 76, the control system 62 determines whether or not the stored signal-level change is greater than a predetermined value or level. If this is the case, the control system 62 sets a home band scan flag F-HBS at step 78 before the routine comes to an end. If this is not the case, the routine comes to an end.

With regard to home band scan when a mobile station is roaming, it carries out the home band scan for a preferred CCh. If the mobile station determines that the signal-level of the received CCh is greater than a predetermined value, it will stop roaming and start periodically checking the CCh from the home system to wait for a call. If the signal-level of the received CCh is not greater than the predetermined value, the mobile station will stay on the current system.

The before-mentioned signal-level recording table may be a portion of a random access memory (RAM) of the mobile station. The CCh to be received for detection of signal-level may be a CCh from a cell site within which the mobile station registers or the most powerful one of various CChs from the neighboring cell sites.

FIG. 6 is a flow diagram illustrating the home band scan routine. At step 80, the control system 62 determines whether or not the flag F-HBS has been set. If this is not the case, the mobile station 30 stays on the current system and periodically checks the CCh to wait for a call (see step 100). If this is the case, the routine proceeds to step 82. At step 82, the control system 62 determines whether or not a home band scan time T-HBSCAN, i.e., the content of timer 65, is equal to zero. That is, whether or not a predetermined scan time has elapsed is determined at step 82. If the scan time T-HBSCAN has not yet elapsed, the mobile station 30 stays on the current system (see step 100). If, at step 82, it is determined that the scan time T-HBSCAN has expired, the routine proceeds to step 84. At step 84, the signal-level recording table is accessed and the control system 62 determines whether or not the stored change in signal-level is greater than a predetermined value. If this is the case, the routine proceeds to step 86. At step 86, the control system 62 scans home band for CCh. At the next step 88, the control system 62 determines whether or not there is any CCh in home band, which has received signal-level greater than a predetermined value. If this is the case, the mobile station 30 stops roaming and starts checking or monitoring CCh from the home system to wait for a call (see step 90). The routine proceeds to step 92 after step 90. At step 92, the control system 62 resets the home band scan flag F-HBS and roam flag F-ROAM.

If, at step 84, it is determined that the stored change in signal-level is not greater than the predetermined value, the mobile station 30 stays on the current system and checks CCh to wait for a call (see step 94). If, step 88, it is determined that there is no satisfactory CCh in the home band, the mobile station 30 stays on the current system (see step 94). After step 94, the routine proceeds to step 96. At step 96, the control system 62 sets T-HBSCAN equal to a scan time TSCAN. At step 98, the control system 62 restarts timer 65 or timer routine where decrement of T-HBSCAN is made at clock intervals. The setting is such that the scan time TSCAN becomes longer as the stored change in signal-level becomes smaller.

The preceding description now clarifies that, if a change in received signal-level is small, the scan time between home band scans is long. In general, a change in received signal-level is small when the movement of a mobile station within a cell site coverage area is not great. The long scan time reduces the frequency of band scans and the power-on time. This is advantageous for conservation of the battery life.

If a change in received signal-level is great, the scan time is short. When the movement of a mobile station within a cell site coverage area is great, a signal-level changes greatly. The short scan time assists the mobile station in returning to the home system quickly.

The stored change in the signal-level recording table may determine the scan time TSCAN. In this case, the scan time TSCAN may be altered in response to the change in signal-level that is obtained when the recording table is accessed.

Figure 7:
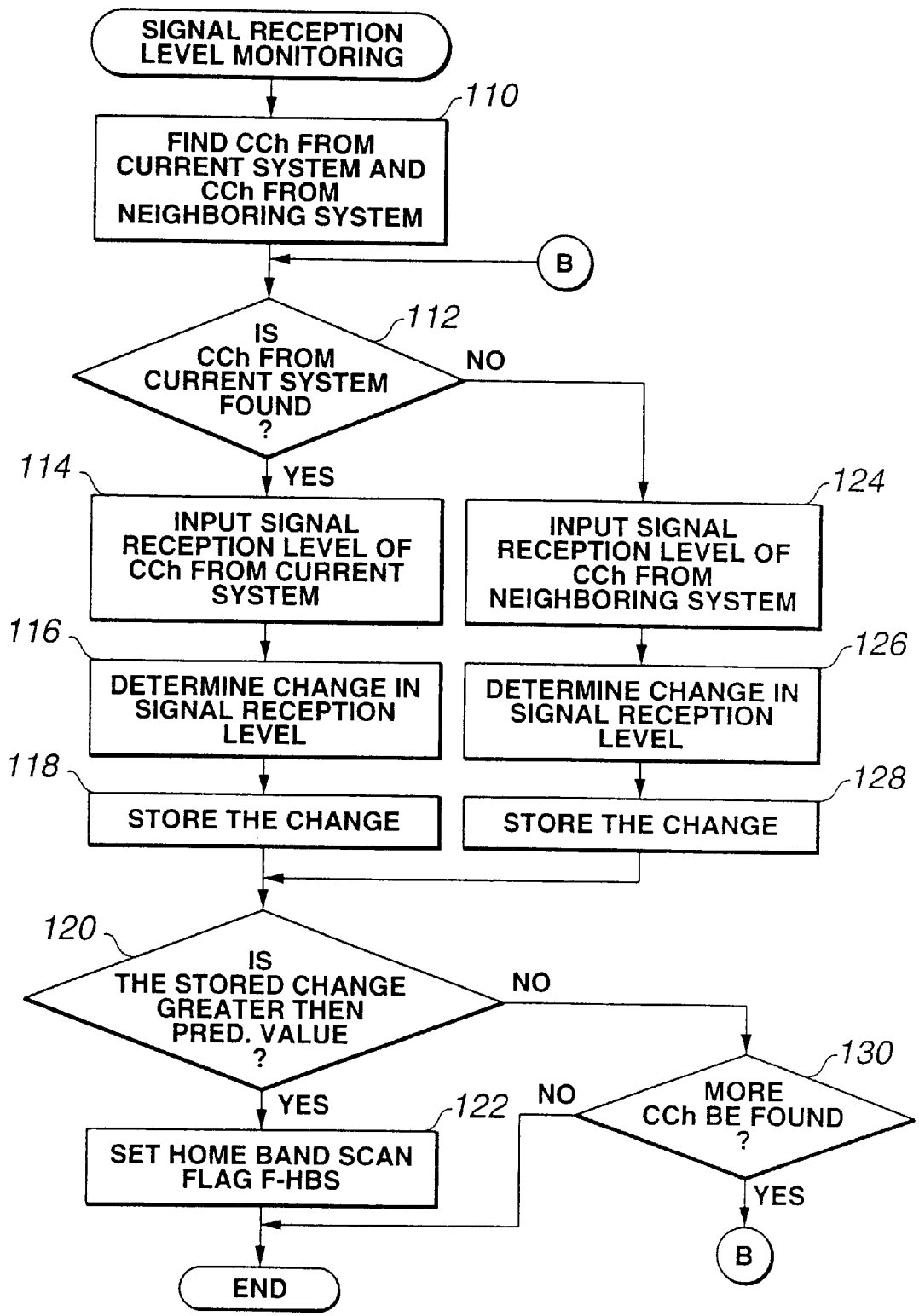
FIG. 7 is a flow diagram similar to FIG. 5. illustrating another example of a signal reception level monitoring routine.

The second embodiment is described mainly in connection with FIG. 7. This embodiment is substantially the same as the first embodiment discussed above except the provision of the routine of FIG. 7 instead of the routine of FIG. 5.

According to the second embodiment, when roaming, a mobile station checks periodically not only the present CCh from the current system, but also other CCh(s) from the neighboring system and/or cell site. A change in signal-level is calculated with respect to each CCh received by the mobile station.

Whenever a roaming mobile station checks periodically the present CCh to wait for a call, it executes a routine of FIG. 7.

At step 110 in FIG. 7, a control system 62 identifies the received CChs. At step 112, the control system 62 determines whether or not the received CCh is from the current system. If this is the case, the routine proceeds to step 114. At step 114, the control system 62 inputs a received signal-level, as detected at a detector 58, of the received CCh. At step 116, the control system 62 determines a change or difference between the present signal-level and the last signal-level. At step 118, the control system 62 stores the determined change at a signal-level recording table within an appropriate memory or storage device. At interrogation step 120, the control system 62 determines whether or not the stored signal-level change is greater than a predetermined value or level. If this is the case, the control system 62 sets a home band scan flag F-HBS at step 122 before the routine comes to an end. If this is not the case, the routine proceeds to step 130. At step 130, the control system 62 checks whether or not there are any other CCh received. If this is the case, the routine proceeds back to step 112.

If, at step 112, it is determined that the received CCh is not from the current system, the routine proceeds to step 124. At step 124, the control system 62 inputs a received signal-level, as detected at a detector 58, of the received CCh. At step 126, the control system 62 determines a change or difference between the present signal-level and the last signal-level. At step 128, the control system 62 stores the determined change at a signal-level recording table within an appropriate memory or storage device. At interrogation step 120, the control system 62 determines whether or not the stored signal-level change is greater than the predetermined value or level. If this is the case, the control system 62 sets a home band scan flag F-HBS at step 122 before the routine comes to an end. If this is not the case, the routine proceeds to step 130.

The second embodiment also uses the change in signal-level of the received CCh from the neighboring system and/or cell site in determining scan time TSCAN (see step 96 in FIG. 6). This is because such change may indicate the amount of movement of a mobile station within a cell site. In a similar manner to the first embodiment, the scan time TSCAN may be altered in response to the change in signal-level of the received CCh from the neighboring system and/or cell site.

In each of the first and second embodiments, the signal-level recording table is provided per each received CCh to store change in signal-level. The table may store the received signal-level for subsequent calculation of a change in signal-level.

While the present invention has been particularly described, in conjunction with the preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A mobile station capable of quickly returning to a home system of the mobile station from operation to roam within a communication network, the communication network comprising a plurality of cell sites, the mobile station comprising:

a detecting system for detecting, when the home system is not available, signal-level of an available control channel; and a control system to determine a change in the signal-level, said control system being operative to control scans of band of the home system in response to said determined change in the signal-level.

2. The mobile station as claimed in claim 1, wherein said control system is operative to let said detecting system detect signal-level of each control channel, other than said available control channel, of neighboring cell sites.

3. The mobile station as claimed in claim 1, wherein said control system determines the change by calculating a difference between the present signal-level and the last signal-level.

4. The mobile station as claimed in claim 3, wherein said control system is operative to scan the band of the home system when the determined change is greater than a predetermined value.

5. The mobile station as claimed in claim 1, wherein said control system includes a timer, and scans the band of the home band upon elapse of a scan time set in the timer.

6. The mobile station as claimed in claim 5, wherein said scan time is variable with the determined change in signal-level.

7. The mobile station as claimed in claim 5, wherein said control system is operative to determine whether to scan the band of the home system in response to the determined change in signal-level upon elapse of the scan time.

8. The mobile station as claimed in claim 1, wherein said control system is operative to stop roaming in response to signal-level of control channel from the home system.

9. The mobile station as claimed in claim 8, wherein said control system stops roaming when the signal-level of the received control channel from the home system is greater than a predetermined value.

10. A roaming process for enabling a mobile station to quickly return to a home system of the mobile station from operation to roam within a communication network, the communication network comprising a plurality of cell sites, the mobile station comprising:

detecting, when the home system is not available, signal-level of an available control channel;

determining a change in the signal-level; and controlling scans of band of the home system of the mobile station in response to said determined change in the signal-level.

11. The roaming process as claimed in claim 10, including:

detecting signal-level of each control channel, other than said available control channel, from the neighboring cell sites.

12. The roaming process as claimed in claim 11, including:

storing the detected signal-level in signal-level recording table;

determining a change in signal-level by calculating a difference between the stored present detected signal-level and the stored last detected signal-level; and controlling scans of band of the home system in response to said determined change in signal-level.

13. The roaming process as claimed in claim 12, including:

scanning the band of the home system when the determined change is greater than a predetermined value.

14. The roaming process as claimed in claim 13, wherein the band of the home band is scanned upon elapse of a scan time set in the timer.

15. The roaming process as claimed in claim 14, wherein said scan time is variable with the determined change in signal-level.

16. The roaming process as claimed in claim 14, including:

determining whether to scan the band of the home system in response to the determined change in signal-level upon elapse of the scan time.

17. The roaming process as claimed in claim 10, including:

stopping roaming in response to signal-level of control channel from the home system.

18. The roaming process as claimed in claim 10, including:

stopping roaming when the signal-level of the received control channel from the home system is greater than a predetermined value.

* * * * *